W. A. SCHULTHEIS.
GASKET.
APPLICATION FILED MAY 25, 1910.
965,022.
Patented July 19, 1910.
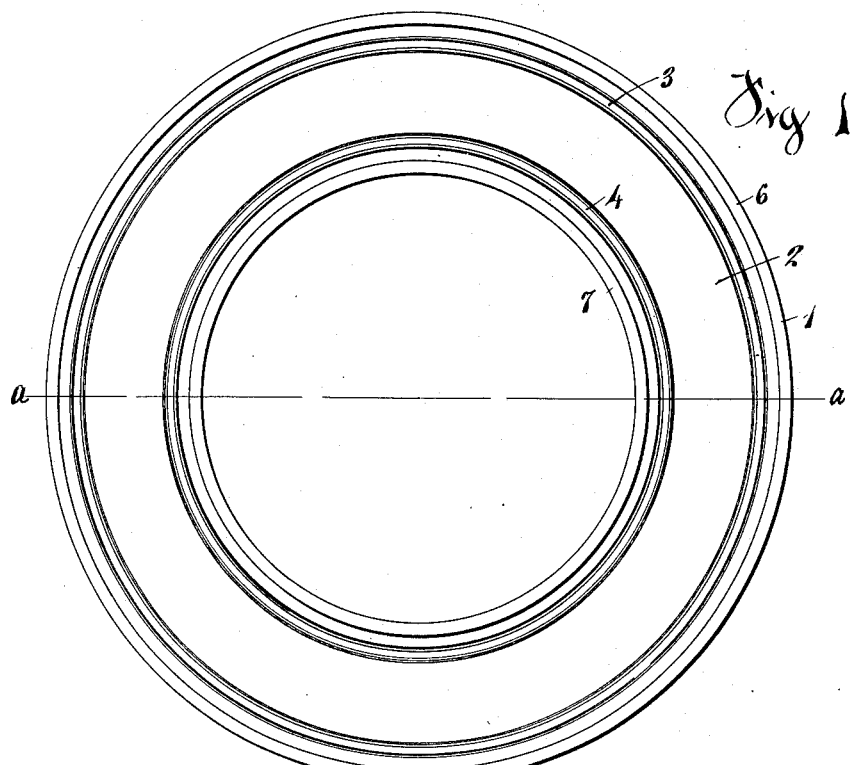
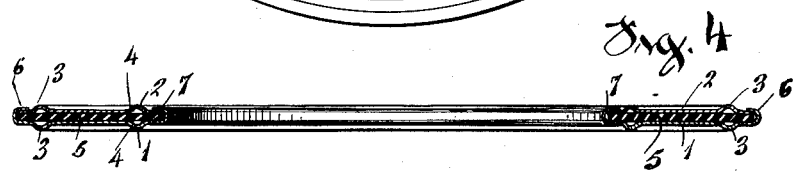
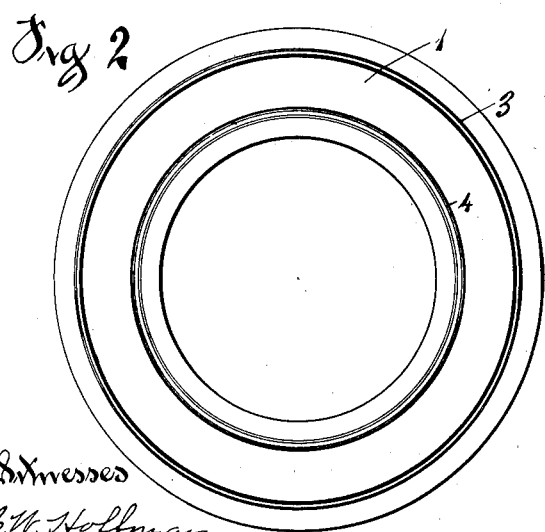
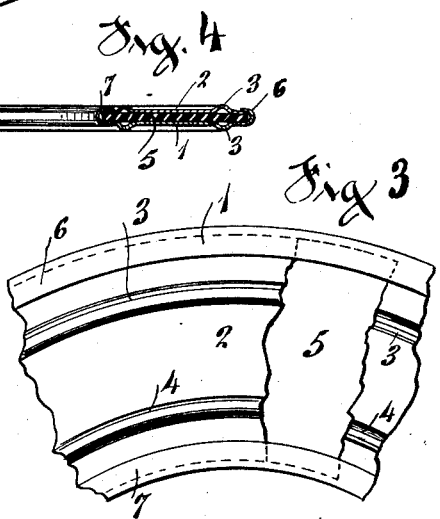
Inventor
William A. Schultheis
By Arthur H. Ewald,
Attorney
Witnesses
C. W. Hoffman
H. Smith

UNITED STATES PATENT OFFICE.

WILLIAM A. SCHULTHEIS, OF CINCINNATI, OHIO.

GASKET.

965,022.  Specification of Letters Patent.  Patented July 19, 1910.

Application filed May 25, 1910. Serial No. 563,417.

*To all whom it may concern:*

Be it known that I, WILLIAM A. SCHULTHEIS, a citizen of the United States, and a resident of Cincinnati, county of Hamilton, and State of Ohio, have invented a new and useful Improvement in Gaskets, of which the following is a full, clear, and exact description, reference being had to the accompanying drawings, forming a part of this specification.

My invention relates to a gasket to be used in connection with pumps, tanks, steam and hot-water boilers, engines, valves, and, in general, in the construction of all pipe work where absolutely tight joints are essential. In all of these uses, especially in those where the variations in temperature of the parts is extreme, the elasticity or resiliency of the gasket or other packing means is of first importance, for the reason that the contraction, following the expansion of the parts when heated, must be met by the packing or a leaking joint will result.

It is the object of my present invention to furnish a gasket of a construction in general similar to that covered by my previous Patent, No. 956,188 of April 26, 1910, in that said gasket may be used over and over again without impairment of its packing efficiency, and one, in addition thereto, of largely increased resilience and elasticity, and, therefore, of highly increased efficiency where the variations of temperature are great, or the parts are subject to vibration.

For the accomplishment of these objects my invention consists of certain novel details of construction as will hereinafter fully appear.

In the several figures of the drawings like numerals indicate like parts.

In the drawings: Figure 1 is a plan view of the top of my improved gasket. Fig. 2 is a similar view of the bottom of the same. Fig. 3 is a detailed view showing more clearly the manner of construction. Fig. 4 is a cross section, on line *a—a* of Fig. 1.

The numeral 1 indicates an annular sheet of any pliable metal, preferably of copper or steel, and 2 indicates a similar sheet of the same material, somewhat narrower, however, than sheet 1. Both of said sheets, 1 and 2, are longitudinally corrugated, each of said sheets having two such corrugations, and all of said corrugations being convex with reference to the bearing surfaces of the gasket; corrugations 3, 3, are near the outer circumferences of the said sheets, and corrugations 4, 4, near the inner circumferences thereof, thus leaving a broad, flat surface intervening between the corrugations on each sheet. A layer of asbestos or other suitable packing material, 5, is interposed between the metal sheets 1 and 2, as is clearly shown in Figs. 3 and 4 of the drawings, and in assembling the parts, sheet 1, which is sufficiently wide for the purpose, is turned over at the outer and inner circumferences and the flanges 6 and 7 made to overlap the sheet 2 and the interposed layer of packing. When thus assembled, the convex corrugations 3, 3, on said sheets 1 and 2 will be opposite each other and the corrugations 4, 4 on said sheets similarly disposed; and the completed gasket will thus present for bearing upon the parts of the joint, two pliable metal sides, said sides having longitudinal convex corrugations near their outer and inner circumferences with broad, flat surfaces intervening, by means of which construction high elasticity together with the requisite contact is afforded.

Having thus described my invention what I claim as new and desire to secure by Letters Patent, is:

1. A gasket comprising a sheet of packing material and a pliable metal sheath completely enveloping said sheet, said metal sheath having longitudinal convex corrugations near the edges of its bearing surfaces.

2. A gasket comprising a sheet of packing material between two annular pliable metal sheets, said metal sheets having longitudinal convex corrugations near their outer and inner circumferences, and one of said metal sheets being of greater width than the other, and being turned over at both its outer and inner circumferences to overlap said sheet of packing material and the other of said metal sheets.

WILLIAM A. SCHULTHEIS.

Witnesses:
ALFRED M. ALLEN,
ARTHUR H. EWALD.